United States Patent Office 3,378,757
Patented Apr. 16, 1968

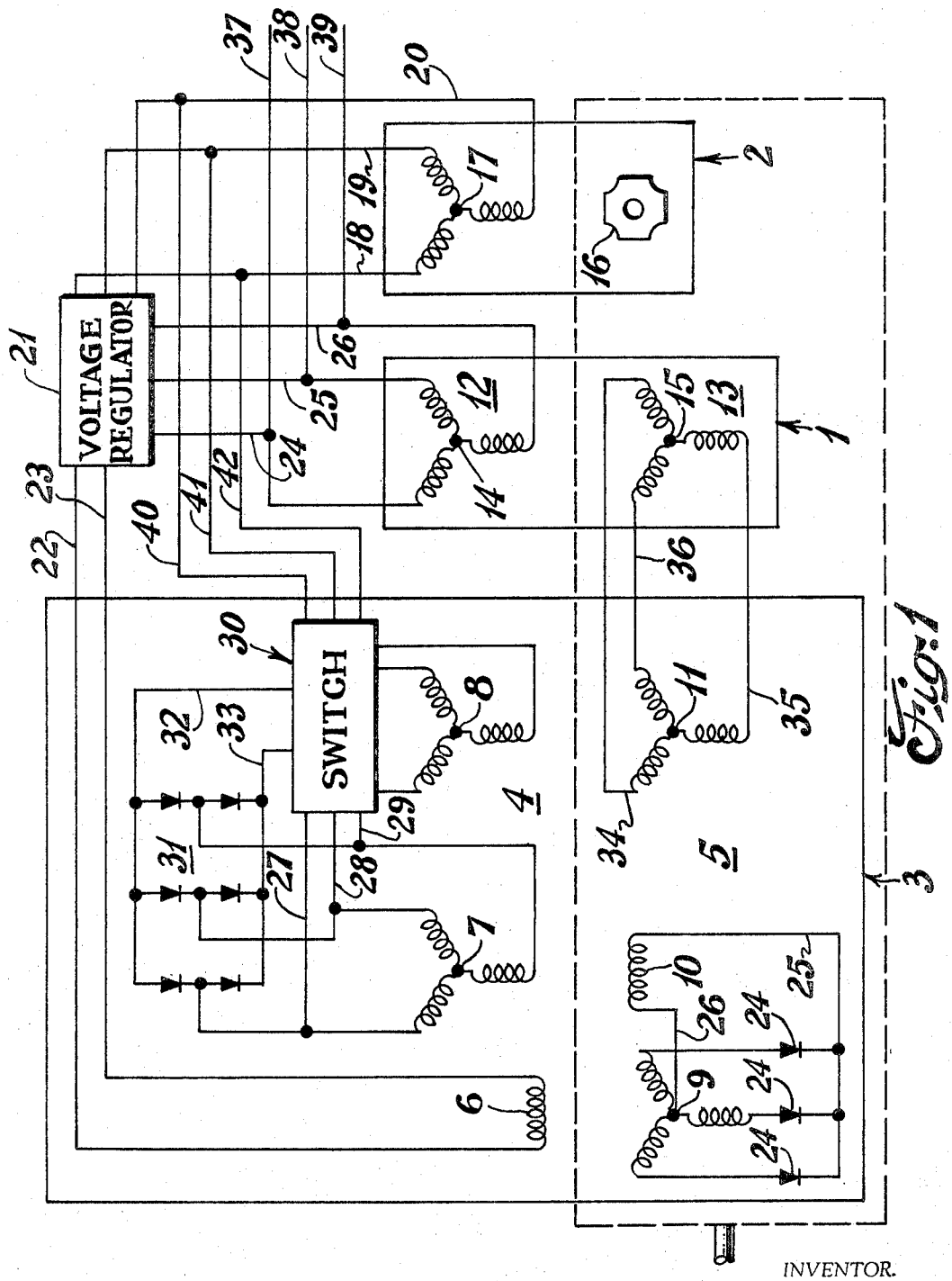

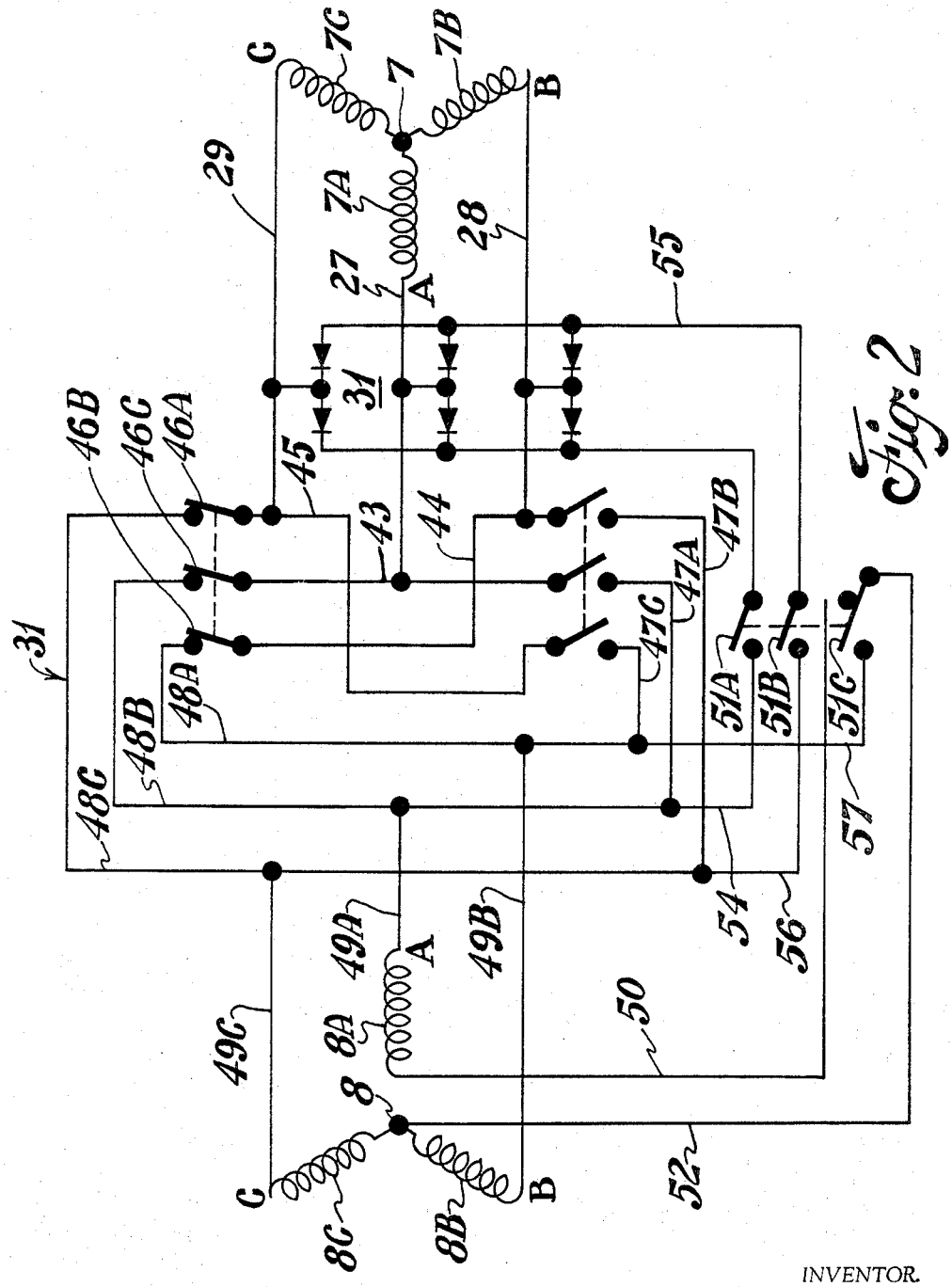

3,378,757
NARROW FREQUENCY RANGE, WIDE SPEED
RANGE, BRUSHLESS A.C. GENERATOR
Frederick Milton Potter, Little Silver, N.J., assignor to
The Bendix Corporation, Eatontown, N.J., a corporation of Delaware
Filed Aug. 4, 1965, Ser. No. 477,260
5 Claims. (Cl. 322—32)

ABSTRACT OF THE DISCLOSURE

An arrangement wherein an output generator is supplied with excitation of a frequency as determined by the speed of the driving member. Means are provided for selecting the frequency for predetermined speed ranges thus enabling the output frequency to be maintained within a predetermined range.

The present invention relates to dynamoelectric machines and more particularly to a narrow frequency-wide speed range generating system.

It is desirable in many applications to maintain the output frequency of an A.C. generator within a predetermined range from a variable speed source. With a wide range of input speed, heretofore it has required constant speed drives of various types. However, they are all quite complex, bulky, difficult to control and require extensive and costly maintenance. Further, often it is not necessary to maintain the precise frequency obtainable from the drives.

The present invention provides an arrangement wherein the output generator is supplied with excitation of a frequency as determined by the speed of the driving member. Means are provided for selecting the frequency for predetermined speed ranges thus enabling the output frequency to be maintained within a predetermined range.

It is an object of the invention to provide a novel dynamoelectric machine.

Another object of the invention is to provide means for maintaining an output frequency within a predetermined range from a variable speed input.

Another object of the invention is to provide means for providing excitation for an output generator in accordance with a variable speed input.

Another object of the invention is to maintain a narrow frequency range over a wide range of input speeds.

The above and other objects and features of the invention will appear more fully hereinafter from a consideration of the following description taken in connection with the accompanying drawings wherein one example is illustrated by way of example.

In the drawings:

FIGURE 1 is a schematic diagram of a generating system embodying the invention.

FIGURE 2 is a schematic diagram of the frequency selector switch.

Referring now to FIGURE 1 of the drawing, basically the system is made up of three elements, an A.C. generator 1, and exciter 2 and a frequency supply generator 3. The frequency supply generator includes a stator 4 and rotor 5. The stator 4 has a plurality of windings, as an example, a ten-pole field winding 6, a two-pole armature winding 7 and a four-pole field winding 8, whose functions will be explained later. Adjacent to the stator 4 and in operative relationship thereto is the rotor 5 which also has a plurality of windings, for example a ten-pole armature winding 9, a two-pole field winding 10 and a four-pole armature winding 11, the functions of which will be explained later. It will be understood that the numbers of poles of the rotor and stator winding may be selected with differing values, to accomplish those functions. The construction of the frequency supply or input generator 3 is similar to that illustrated and described in co-pending application Ser. No. 465,003 filed June 18, 1965.

The output generator 1 has a stator 12 and rotor 13. The stator 12 has a fixed armature winding 14, which, for example, may be a four-pole winding. Adjacent to the stator 12 and in operative relationship thereto is the rotor 13 which has an A.C. field winding 15 which, for example, may also be a four-pole winding.

The exciter 2 is of the conventional PM type and has a permanent magnet rotor 16 and a three phase armature winding 17, as an example, a ten-pole winding. It is understood that other types of exciters could also be used. The PM rotor 16, rotor 5 and rotor 13 are all mounted on the same shaft which is adapted to be driven from a variable speed source, for example, an aircraft engine (not illustrated).

The output from the winding 17 of the exciter 2 is connected by conductors 18, 19 and 20 to the input of a voltage regulator 21. The output of the voltage regulator 21 is connected by conductors 22 and 23 across the winding 6 of the generator 3. The voltage regulator 21 may be of the type which provides excitation for the winding 6 in accordance with the output voltage of the generator 1 and is connected to sense the output voltage of the generator 1 by conductors 24, 25 and 26.

The winding 6, when energized, produces A.C. power in the rotating armature winding 9, which illustratively may be a ten-pole winding. The power generated by the armature winding 9 is connected through rectifiers 24 by conductors 25 and 26 across the rotating field winding 10, which may illustratively be a two-pole winding. The winding 10, when energized, produces A.C. power in the stationary armature winding 7 which illustratively may be a two-pole winding. The output from the winding 7 is connected by one circuit by means of conductors 27, 28 and 29 through a frequency sensitive switch 30 to the stationary winding 8 which illustratively may be a four-pole winding. The output from the winding 7 is also connected by another circuit through a full wave rectifier 31 and conductors 32 and 33 to the winding 8. The circuit of the switch 30 is described below with relation to FIGURE 2.

Windings 8 and 11 are respectively polyphase windings of like numbers of poles (illustratively, four poles). In such a machine, excitation of winding 7 by polyphase power of a given frequency will produce a rotating magnetic field, rotating at a speed which is the ratio of the frequency and the number of pole-pairs. Thus, for a four-pole winding excited at 60 cycles per second, the field rotates at a speed of 30 revolutions per second or 1800 r.p.m. If the winding 11 were stationary, this rotating field would induce in winding 11 corresponding currents of the same frequency (60 cycles per second). However, if winding 11 rotates in the opposite direction from that of the field rotation, then the output frequency will be the input frequency (60 cycles per second) increased by an amount equal to the rotational speed multiplied by the number of pole-pairs. Conversely, if the field rotates in the same direction as that of winding 11, the output frequency will be decreased by the same amount. On the other hand, if the winding 8 is excited by direct current, then the output frequency from winding 11 will be equal to its speed times its number of pole-pairs. The frequency sensitive switch 30 determines which of these situations occur here, by reversing the phase-rotation of the excitation of winding 11 or by substituting D.C. excitation.

Since the output of winding 7 will have a frequency equal to the input speed ($S_1$) times its pole-pairs, (illustratively, two) in the first case, where frequency is added, the output frequency will be $S_i$ plus $2S_i$, or equivalent to three pole-pairs (six poles). Where the frequency is subtracted, the output will be $2S_i$ less $S_i$, or equivalent to one pole-pair (two poles). Where direct current is used for excitation, the frequency will correspond to four poles.

Upon the input speed of the rotor 5 being in a first predetermined range, for example, between 4000 and 5300 r.p.m., the switch 30 connects the two-pole armature winding 7 to the stationary four-pole winding 8 with phase-rotation to add frequency so that the output of the four-pole rotor winding 11 is of a frequency equivalent to six poles. When the input speed reaches the upper limit of the speed range (in this example, 5300 r.p.m.) the switch 30 is activated to disconnect the winding 7 from the winding 8 and reconnect the winding 7 through the rectifier 31 and switch 30 to the winding 8. The output from the winding 7 is now connected through the rectifier 31 to the winding 8 which is connected in single-phase fashion to make a distributed D.C. field. Thus this makes a four-pole generator out of this winding and the frequency generated in the winding 11 will be that of a four-pole machine. After the input speed reaches a further predetermined point (for example, 6400 r.p.m.) another switching operation occurs. The output of the winding 7 is disconnected from the rectifier 31 and reconnected through the switch 30 with the phase-rotation reversed from the first situation so that the output frequency of the winding 11 corresponds to the difference between four and two poles, namely, two poles. This condition is maintained for speeds above the 6400 r.p.m. level. Upon a reduction in speed the steps are reversed.

The output from the winding 11 is connected by conductors 34, 35 and 36 in phase opposition to the winding 15 of the generator 13. The winding 15 will be energized by polyphase power dependent upon the energization of the winding 11. Energization of the winding 15 will induce currents of a frequency dependent upon the energization of the winding 15 and the rotation speed in the output winding 14 which is connected to a suitable load (not shown) by output conductors 37, 38 and 39. Thus winding 14 produces three different frequency ranges. In the example given, for input speeds from 4000 to 5300 r.p.m., the frequency will range from 333 to 442 cycles per second. For input speeds from 5300 to 6400 r.p.m., the frequency will be from 354 to 425 cycles per second, while for input speeds from 6400 up, the frequency will be 320 cycles per second and up. Thus as the speeds goes up, for each step the frequency is dropped back.

The frequency sensitive switch 30 is connected by conductors 40, 41 and 42 to the output winding 17 of the exciter 2. The output frequency of the exciter 2 is a function of the speed of revolution of the rotor 16 which is mounted on the same shaft as the rotors 5 and 13.

For an explanation of switching for obtaining the differing frequencies for different speeds, reference is made to the schematic diagram of FIGURE 2. The three windings 7A, 7B and 7C, forming winding 7, are connected respectively by conductors 27, 28 and 29 and conductors 43, 44 and 45 to the corresponding terminals 46A, 46B and 46C of a three-pole switch 46, and also to the corresponding terminals 47A, 47B and 47C of a second three-pole switch 47. It is to be noted that the switch members 47B and 47C are transposed with reference to the switch members 46B and 46C. A conductor 48A connects the other side of the switch member 46A to the other side of the switch member 47A. Conductor 48B connects the other side of switch member 46B to the other side of switch member 47C and a conductor 48C connects the other side of the switch member 46C to the other side of the switch member 47B. The conductors 48A, 48B and 48C are connected respectively by conductors 49A, 49B and 49C to the three windings 8A, 8B and 8C, forming winding 8. The winding 8A is connected to the junction of the windings 8B and 8C by conductor 50, switch member 51C and conductor 52.

The input of rectifier 31 is also connected to conductors 27, 28 and 29. One side of the output of the rectifier 31 is connected by conductor 53 to one side of switch member 51A. The other side of the switch member 51A is connected by conductor 54 to the conductor 48A. The other side of the output of the rectifier 31 is connected by conductor 55 to one side of switch member 51B. The other side of the switch member 51B is connected by conductor 56 to the conductor 48C. Also another contact on switch member 51C is connected by conductor 57 to conductor 48A.

For one speed range, for example, 4000 to 5300 r.p.m., switch members 46A, 46B and 46C will be in a closed position, as illustrated. This connects the output from the two-pole winding 7 to the four-pole winding 8, in a phase-rotation to make a frequency output equivalent to a six-pole winding. When the speed is increased to the next range, for example, 5300 to 6400 r.p.m., the switch 31 actuates the contacts 46A, 46B and 46C to the open position and closes switch members 51A and 51B. Also switch member 51C is actuated to disconnect conductor 52 and connect conductor 57 to conductor 50. This connects the winding 8 in single phase across the rectifier 24 to make a distributed D.C. field. This makes a four-pole generator out of the winding and the frequency output is that of a four-pole machine.

Upon a further increase in speed to another range, for example, 6400 r.p.m. and up, another switching operation will occur. The switch members 51A and 51B will be actuated to an open position and the switch member 51C will disconnect the conductor 52 from the conductor 57 and connect it to the conductor 50. Also switch members 47A, 47B and 47C will be actuated to a closed position to connect the output from the winding 7 in opposite phase-rotation to the four-pole winding 8, thus providing a frequency equivalent to a two-pole winding.

It will be understood that switches 46, 47 and 51 are actuated at the speeds indicated by suitable speed-responsive means, which may be of conventional design, and whose details form no part of the present invention.

Although only three stages have been illustrated and described for supplying three different frequencies for three different speed ranges, it is understood that other arrangements of stages could be utilized. The reason for the different stages is to hold the output frequency to a minimum range over the desired speed ranges. With a very small speed range, only one stage could be utilized. Also other combinations of windings could be used as would be determined by the speed range and output frequency.

Thus the present invention provides a frequency within a predetermined range from a variable-speed source with virtually no wearing of parts. Being of a brushless configuration, there are no brushes to require frequent maintenance. No gearing is required.

Although only one embodiment of the invention has been illustrated and described in detail, various changes in the form and relative arrangement of the parts, which will now appear to those skilled in the art, may be made without departing from the scope of the invention.

What is claimed is:

1. A narrow frequency range generating system comprising an input generator having a plurality of different pole-pair windings, an output generator having field and armature windings, said input generator and said output generator being mounted for rotation together, switch means responsive to predetermined speed ranges to selectively connect said output generator field winding to the output of one of said pole-pair windings and thereby, control the output frequency of said output generator, in accordance with said predetermined speed ranges.

2. A narrow range frequency generating system comprising an input generator having a stator and a rotor, said stator having a first field winding, an armature winding and a second field winding, said rotor having a first armature winding, a field winding and a second armature winding, rectifier means connecting said first rotor armature winding to said rotor field winding, three position switch means responsive to the speed of rotation of said rotor to connect the output of said stator armature winding to said second stator field winding in phase addition when said speed is in one predetermined range, through rectifiers when said speed is in a second pre-determined range, and in phase opposition when said speed is in a third predetermined range, an output generator having a rotating field winding and a stator armature winding, said rotating field winding mounted for rotation with said input generator rotor, and means connecting the output of said second rotor armature winding to said output generator field winding to excite said output generator with a frequency as determined by said speed ranges.

3. A narrow range frequency generating system comprising an input generator having a stator and a rotor, said stator and rotor having a plurality of corresponding windings, switch means for changing the connections between said stator and rotor windings in accordance with predetermined speed ranges of said rotor, an output generator having a rotating field winding and a stator output winding, said output generator rotating field winding being mounted for rotation with said input generator rotor, and means for energizing said output generator rotating field winding from the output of said input generator with a frequency in accordance with said predetermined speed ranges.

4. A narrow range frequency generating system comprising a brushless input generator having a stator and a rotor, said stator having a D.C. field winding, a multipole armature winding and a multipole A.C. field winding, said rotor having a first multipole armature winding, a D.C. field winding and a second multipole armature winding, a brushless output generator having a stator and a rotor, said rotor being mounted for rotation with said input generator rotor, said output generator rotor having a multipole A.C. field winding and said output generator stator having a mulitphase stator winding, and switch means responsive to the speed of said rotors for connecting said input generator multipole armature winding to said input generator multipole A.C. field winding in one sense when said speed is below a predetermined value and in another sense when said speed is above said predetermined value, and means connecting the output from said input generator rotor second multipole armature winding to said output generator multipole A.C. field winding.

5. The combination as set forth in claim 4 and including an exciter connected to provide excitation to said input generator.

References Cited
UNITED STATES PATENTS
2,157,830  5/1939  McLenegan _____ 322—62 X
2,854,617  9/1958  Johnson _____ 322—61 X JOHN F. COUCH, *Primary Examiner.*

WARREN E. RAY, *Examiner.*

H. HUBERFELD, *Assistant Examiner.*